United States Patent [19]

Hsu

[11] Patent Number: 6,075,343
[45] Date of Patent: Jun. 13, 2000

[54] RECHARGEABLE BATTERY PACK MODULE

[75] Inventor: Chih-Ming Hsu, Tao-Yuan Hsien, Taiwan

[73] Assignee: Quanta Computer Inc., Tao-Yuan Hsien, Taiwan

[21] Appl. No.: 09/249,734

[22] Filed: Feb. 12, 1999

[51] Int. Cl.[7] ............................... H02J 7/00; G08B 21/00
[52] U.S. Cl. ..................... 320/134; 320/106; 320/107; 340/636
[58] Field of Search ...................... 320/134, 106, 320/107, 116, 162, 163, 164; 340/636; 324/426

[56] References Cited

U.S. PATENT DOCUMENTS

| | | | |
|---|---|---|---|
| 5,572,110 | 11/1996 | Dunstan | 320/106 |
| 5,656,915 | 8/1997 | Eaves | 320/118 |
| 5,796,239 | 8/1998 | Van Phuoc et al. | 320/107 |
| 5,883,493 | 3/1999 | Koenck | 320/114 |
| 5,955,869 | 9/1999 | Rathmann | 320/132 |
| 5,964,024 | 12/1997 | Dias et al. | 320/106 |
| 5,998,974 | 12/1999 | Sudo et al. | 320/136 |

*Primary Examiner*—Adolf Deneke Berhane
*Assistant Examiner*—Gregory J. Toatley, Jr.
*Attorney, Agent, or Firm*—Renner, Otto, Boisselle & Sklar LLP

[57] ABSTRACT

A rechargeable battery pack module includes a battery cell set, a DC-to-DC converter adapted to be connected to one of a portable computer and an AC adapter and operable so as to generate charging current, a safety switch control unit operable so as to permit charging and discharging of the battery cell set, a charging protection unit to control operation of the safety switch control unit according to the cell voltages of battery cells of the battery cell set, and a battery status indicating unit for storing manufacturer information corresponding to the battery cell set therein and capable of providing the manufacturer information and charging status information of the battery cell set to the portable computer.

16 Claims, 5 Drawing Sheets

RECHARGEABLE BATTERY PACK MODULE

BACKGROUND OF THE INVENTION

1. Field of the Invention

The invention relates to a battery pack module, more particularly to a rechargeable battery pack module for a portable computer.

2. Description of the Related Art

In this age of rapid technological advancement, computers have become indispensable tools in our daily lives. Because of different needs, computers have evolved from a desktop form to a lighter and more compact form for enhanced portability such that use of the computer is no longer limited to the vicinity of a computer table. When using a portable computer outdoors, a rechargeable battery pack module is needed to supply electrical power to operate the computer. Currently, manufacturers continue to perform research in connection with increasing the power capacity of battery pack modules and with making the battery pack modules more environmental friendly. Present nickel-hydrogen (NiH) battery pack modules are now being replaced with lithium-ion (Li-ion) battery pack modules. While the power supplying capacity of conventional lithium-ion battery pack modules can satisfy the requirements of most users, it is noted that the fixed current or fixed voltage recharging schemes which are currently available are still unsatisfactory in terms of the charging time and safety features during charging. There is still much room for improvement of the charging circuit of lithium-ion battery pack modules.

It is noted that conventional lithium-ion battery pack modules are integrated into portable computers and are not designed to be detachable therefrom. The conventional lithium-ion battery pack module relies upon the internal circuitry of the portable computer and upon software routines for recharging the same. For example, the lithium-ion battery pack module can be recharged under a slow charge mode or a fast charge mode. In the slow charge mode, a smaller charging current is supplied to the battery pack module while the computer is in use. In the fast charge mode, a larger charging current is supplied to the battery pack module while the computer is not in use. Regardless of the mode under which the battery pack module is charged, charging of the battery pack module has to be conducted internally of the portable computer, thereby resulting in inconvenience. Moreover, the conventional charging circuit of lithium-ion battery pack modules is unable to detect for the presence of abnormalities in the temperature of the battery pack module during charging. This can arise in a dangerous situation in the event of excessively high temperatures during charging. In addition, conventional battery pack modules are unable to indicate manufacturer information relevant thereto, such as the brand of lithium cells that are in use, the manufacturing date of the lithium cells, etc.

SUMMARY OF THE INVENTION

Therefore, the main object of the present invention is to provide a rechargeable battery pack module that permits recharging thereof internally of a portable computer or externally with the use of an AC adapter.

Another object of the present invention is to provide a rechargeable battery pack module that is capable of providing both manufacturer information and charging status information to a portable computer.

Still another object of the present invention is to provide a rechargeable battery pack module that incorporates two types of charging protection for the battery cells thereof.

A further object of the present invention is to provide a rechargeable battery pack module that can initiate the charging operation automatically.

Accordingly, the rechargeable battery pack module of this invention is adapted to receive a direct current (DC) voltage input from one of a portable computer and an alternating current (AC) adapter so as to be recharged thereby, and comprises:

first and second battery pack terminals;

a battery cell set including a plurality of battery cells connected in series, the battery cell set being connected to the first battery pack terminal, each of the battery cells having a cell voltage;

a DC-to-DC converter having an input side adapted to be connected to said one of the portable computer and the AC adapter, and an output side connected to the second battery pack terminal, the DC-to-DC converter being operable so as to generate charging current from the voltage input;

a safety switch control unit interconnecting the second battery pack terminal and the battery cell set, and operable so as to make electrical connection between the second battery pack terminal and the battery cell set to permit charging of the battery cell set by means of the charging current from the DC-to-DC converter and to permit discharging of the battery cell set via the second battery pack terminal, and so as to break the electrical connection between the second battery back terminal and the battery cell set to stop charging and discharging of the battery cell set;

a charging protection unit connected to the battery cell set and the safety switch control unit, the charging protection unit controlling the safety switch control unit to break the electrical connection between the second battery pack terminal and the battery cell set when the cell voltage of anyone of the battery cells falls out of a predetermined range; and a battery status indicating unit for storing manufacturer information corresponding to the battery cell set therein, and connected to the battery cell set and capable of obtaining charging status information therefrom, the battery status indicating unit being adapted to be connected to the portable computer and being capable of providing the manufacturer information and the charging status information to the portable computer to permit display of the manufacturer information and the charging status information on a monitor of the portable computer.

Preferably, a charging controller is connected to the DC-to-DC converter and the battery cell set, and enables the DC-to-DC converter to generate the charging current in accordance with the cell voltages of the battery cells. A temperature detector is connected to the charging controller and detects the temperature of the battery cell set. The charging controller disables the DC-to-DC converter from generating the charging current when the temperature of the battery cell set exceeds a predetermined temperature limit. The charging controller further controls the DC-to-DC converter to initiate charging of the battery cell set automatically when residual charged energy stored in the battery cell set drops below a preset value after a predetermined time period starting from the most recent time the battery cell set was fully charged using the AC adapter has elapsed.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
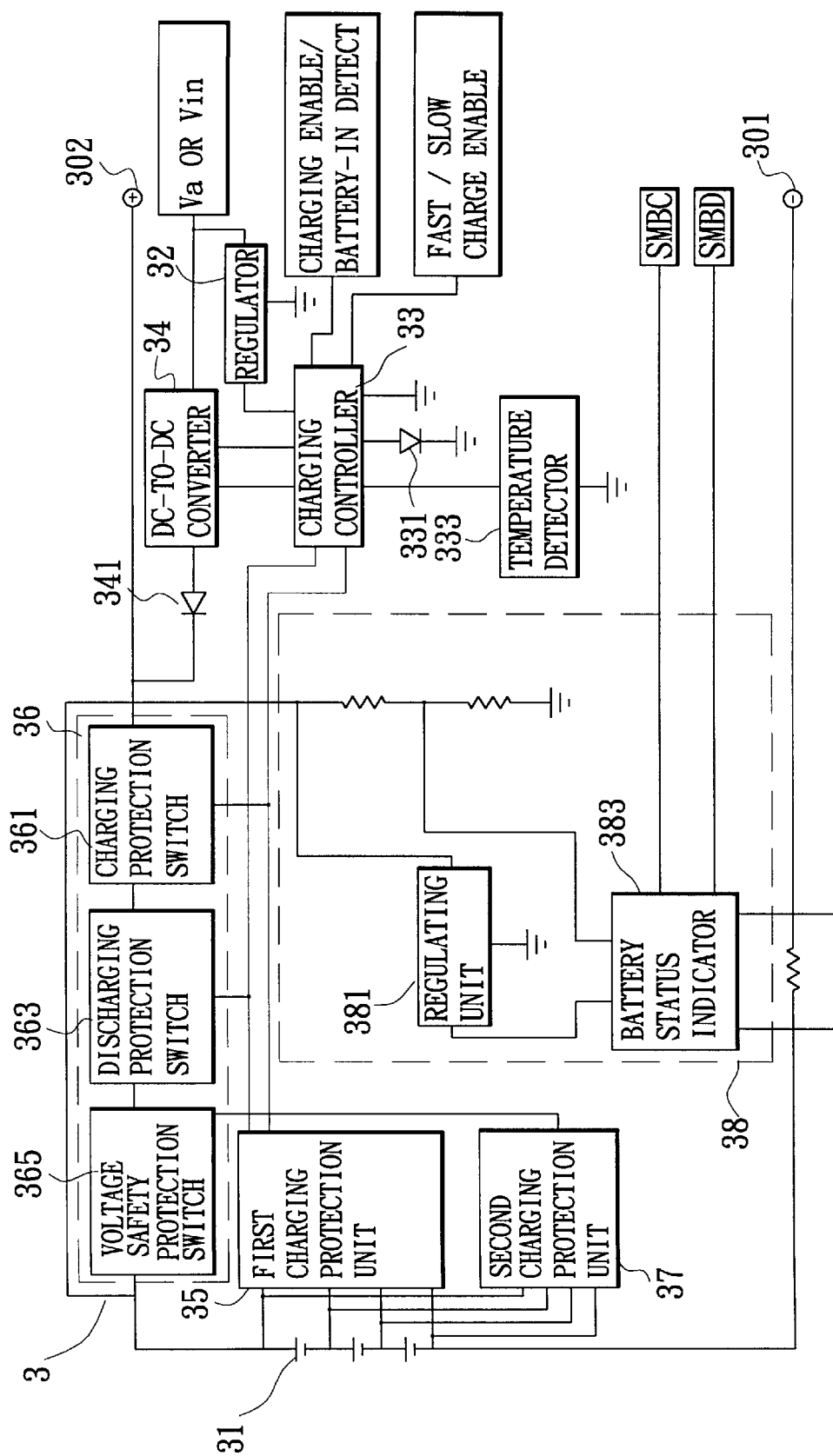
FIG. 1 is a schematic circuit block diagram of the preferred embodiment of a rechargeable battery pack module according to the present invention.

Referring to FIG. 1, the preferred embodiment of a rechargeable battery pack module 3 according to the present invention is shown to comprise a battery cell set 31, a regulator 32, a charging controller 33, a Dc-to-DC converter 34, a first charging protection unit 35, a safety switch control unit 36, a second charging protection unit 37, and a battery status indicating unit 38.

In this embodiment, the battery cell set 31 is formed from three lithium-ion (Li-ion) battery cells that are connected in series. The battery cell set 31 is connected to a first battery pack terminal 301.

The DC-to-DC converter 34 has an input side adapted to be connected to a portable computer 1 (see FIG. 2) or an AC adapter 2 (see FIG. 2) to receive a voltage input (Va) from the portable computer 1 or a voltage input (Vin) from the AC adapter 2. The output side of the DC-to-DC converter 34 is connected to a second battery pack terminal 302 via a diode 341. The diode 341 prevents reverse flow current from flowing into the output side of the DC-to-DC converter 34.

The regulator 32 is adapted to receive the voltage input (Va or Vin) from the portable computer 1 or the AC adapter 2. Assuming that the voltage input (Va or Vin) from the portable computer 1 or the AC adapter 2 is 19 VDC, the regulator 32 will reduce the amplitude of the voltage input (Va or Vin) to obtain an operating voltage. In this embodiment, the operating voltage is 5 VDC.

Figure 2:
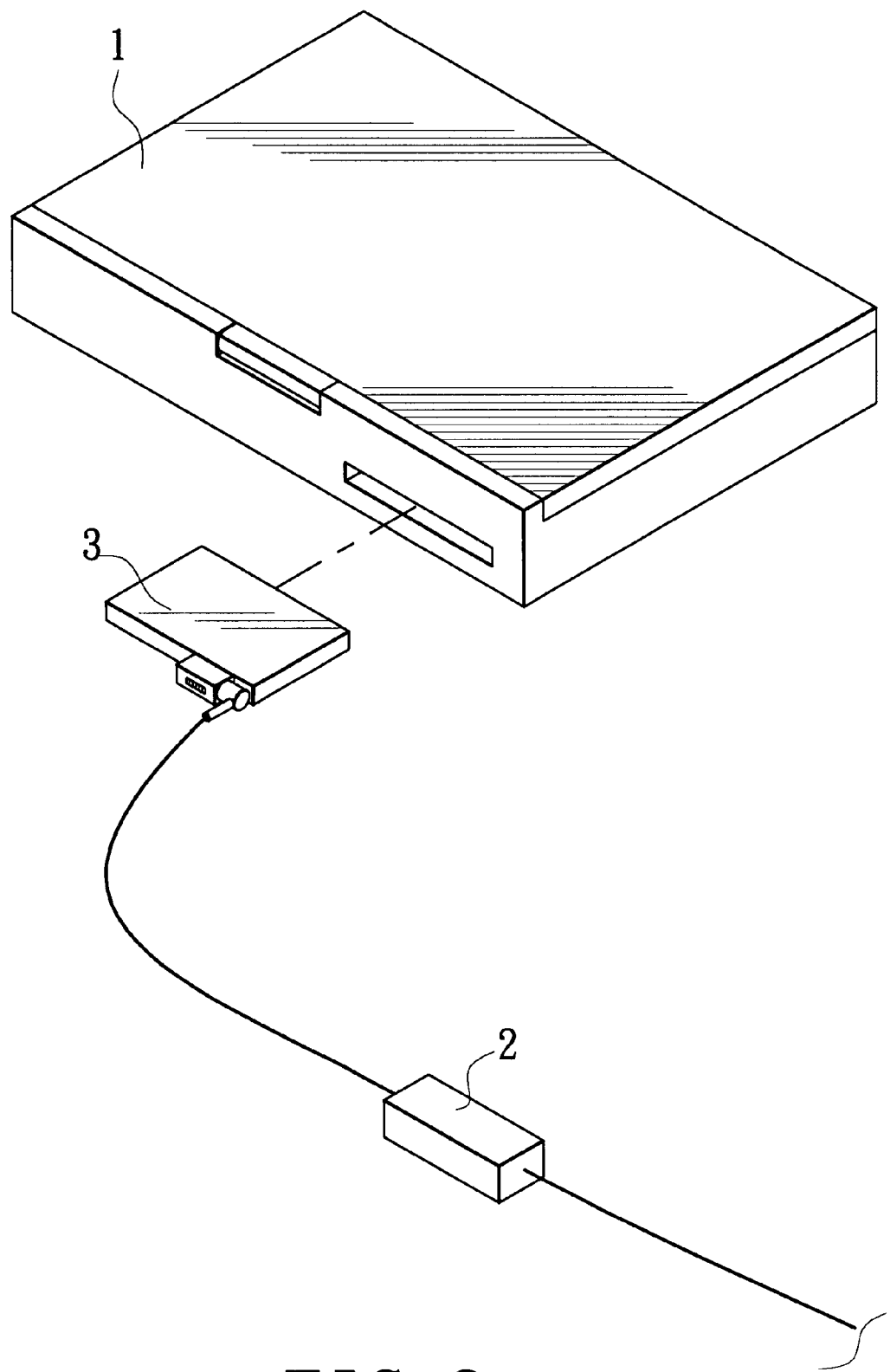
FIG. 2 is a perspective view illustrating the preferred embodiment when removed from a portable computer for charging via an AC adapter.

The charging controller 33 is connected to the regulator 32 and receives the operating voltage therefrom. When the battery pack module 3 is charged internally of the portable computer 1, the battery pack module 3 receives a charging enable/battery-in detect signal and a fast/slow charge enable signal from the portable computer 1. At this time, when charging of the battery pack module 3 is conducted while the portable computer 1 is in use, the charging controller 33 will control the DC-to-DC converter 34 to initiate charging of the battery cell set 31 under a slow charge mode. When charging of the battery pack module 3 is conducted while the portable computer 1 is not in use, the charging controller 33 will control the DC-to-DC converter 34 to initiate charging of the battery cell set 31 under a fast charge mode. In this embodiment, the slow charge mode is carried out under a charging time of about 4 hours and a smaller charging current of about 0.8 A. The fast charge mode is carried out under a charging time of about 2 hours and a larger charging current of about 2.0 A. When the battery pack module 3 is recharged externally of the portable computer 1 with the use of the AC adapter 2, as shown in FIG. 2, the charging controller 33 will control the DC-to-DC converter 34 to initiate charging of the battery cell set 31 under the fast charge mode. Preferably, the charging controller 33 further controls the DC-to-DC converter 34 to supply a charging current of no more than 0.2 A to the battery cell set 31 after the latter has been fully charged.

The charging controller 33 is further connected to an indicator 331, such as a light emitting diode (LED), which is used for indicating the charging status. The charging controller 33 controls the indicator 331 to emit red light when the battery cell set 31 is defective, yellow light when the battery cell set 31 is being charged, and green light when the battery cell set 31 is fully charged.

The charging controller 33 further has the ability to control the DC-to-DC converter 34 to initiate the charging operation automatically. The residual charged energy stored in the battery cell set 31 is continuously detected after a predetermined time period, such as twenty days, starting from the most recent time the battery cell set 31 was fully charged using the AC adapter 2. If it is detected that the residual charged energy of the battery cell set 31 has dropped below 75% capacity, the charging controller 33 will initiate control of the DC-to-DC converter 34 for charging the battery cell set 31 to full capacity automatically. This operation is available if the AC adapter 2 is always connected to the battery pack module 3.

The charging controller 33 is further connected to a temperature detector 333. When the battery cell set 31 is being charged, the temperature detector 333 detects the operating temperature of the battery cell set 31. In this embodiment, charging of the battery cell set 31 is permitted when the temperature of the same is between 0° C. and 55° C. When the temperature of the battery cell set 31 exceeds 55° C., indicative of an overheating condition, the charging controller 33 disables the DC-to-DC converter 34 from generating the charging current output, It is only when the temperature of the battery cell set 31 drops below the predetermined temperature limit of 55° C. will the charging operation be resumed.

The DC-to-DC converter 34 provides converted DC voltages, such as 3.3 volts, 5 volts, 12 volts, to the charging controller 33. In order to enable the DC-to-DC converter 34 to generate different charging currents while maintaining a stable voltage output, a pulse-width modulated (PWM) charging scheme is employed to maintain the voltage output in an appropriate range so as not to affect the charging speed.

The safety switch control unit 36 includes a charging protection switch 361, a discharging protection switch 363 and a voltage safety protection switch 365 that are connected in series and that interconnect the battery cell set 31 and the second battery pack terminal 302. In this embodiment, the charging protection switch 361 and the discharging protection switch 363 include a MOS field effect transistor (MOSFET). The voltage safety protection switch 365 includes a resistive device that contains a thermal fuse. The safety switch control unit 36 normally makes electrical connection between the second battery pack terminal 302 and the battery cell set 31 so as to permit charging of the battery cell set 31 by means of the charging current from the DC-to-DC converter 34 and so as to permit discharging of the battery cell set 31 via the second battery pack terminal 302.

The first charging protection unit 35 is connected to the battery cell set 31 and to the charging protection switch 361 and the discharging protection switch 363. The first charging protection unit 35 further connects the charging controller 33 to the battery cell set 31 to enable the former to control the operation of the DC-to-DC converter 34 in accordance with the cell voltages of the battery cells of the battery cell set 31.

During the charging operation, when the cell voltage of any one of the battery cells of the battery cell set 31 exceeds a predetermined first upper limit, the first charging protection unit 35 will control the charging protection switch 361 to break electrical connection between the second battery pack terminal 302 and the battery cell set 31, thereby interrupting the charging operation. In this embodiment, the first upper limit for each battery cell is 4.2 volts. Once the charging operation is interrupted, the voltage across the battery cell set 31 drops. The first charging protection unit 35 will once again control the charging protection switch 361 to resume the charging operation when the cell voltages of the battery cells of the battery cell set 31 drop below the first upper limit.

In the preferred embodiment, the charging controller 33 continuously detects whether the charging operation was interrupted for a time longer than a predetermined time period (such as 15 seconds). If so, this indicates that the battery cell set 31 is fully charged, and the charging controller 33 controls the DC-to-DC converter 34 to supply a charging current of no more than 0.2 A to the battery cell set 31 at this time.

During a discharging operation, if the cell voltage of any one of the battery cells of the battery cell set 31 falls below a predetermined lower limit, the first charging protection unit 35 will control the discharging protection switch 361 to break the electrical connection between the battery cell set 31 and the second battery pack terminal 302 to stop the discharging operation and prevent damage to the battery cell set 31 due to over-discharging. In this embodiment, the lower limit for each battery cell is 2.4 volts.

The second charging protection unit 37 is connected to the battery cell set 31 and the voltage safety protection switch 365. As mentioned hereinabove, the first charging protection unit 35 will control the charging protection switch 361 to interrupt the charging operation when the cell voltage of any one of the battery cells of the battery cell set 31 exceeds the upper limit. However, in the event that the cell voltage of any one of the battery cells continues to rise and reaches a predetermined second upper limit after the charging protection switch 361 has been controlled by the first charging protection unit 35 to interrupt the charging operation, the second charging protection unit 37 will control the voltage safety protection switch 365 to disconnect the battery cell set 31 from the charging protection switch 361 and the discharging protection switch 363, thereby resulting in added protection for protecting the entire battery pack module 3 and prolonging the service life of the battery cell set 31.

The battery status indicating unit 38 includes a regulating unit 381 and a battery status indicator 383 connected to the regulating unit 381. The regulating unit 381 is connected to the battery cell set 31, and reduces the output voltage of the latter to an appropriate level (such as 5 volts) to obtain an operating voltage for the battery status indicator 383. Manufacturer information for the battery cell set 31, such as manufacturing and expiration dates of the battery cells, are stored in the battery status indicator 383. The battery status indicator 383 is further connected to the battery cell set 31 so as to obtain charging status information, such as residual charged energy stored in the battery cell set, therefrom. The battery status indicator 383 has a system management bus clock (SMBC) terminal and a system management data bus (SMBD) terminal to be connected to the portable computer 1 so that the manufacturer information and the charging status information can be provided to the portable computer 1 for display on a monitor of the latter.

In use, when the user selects to charge the battery pack module 3 internally of the portable computer 1, the portable computer 1 will provide the 19 VDC voltage input (Va) to the DC-to-DC converter 34. At this time, the charging controller 33 controls the DC-to-DC converter 34 to generate an appropriate charging current for charging the battery cell set 31. The charging current depends on the operating state of the computer, as mentioned beforehand. During charging of the battery cell set 31, the charging controller 33 monitors the temperature detector 333 to determine the operating temperature of the battery cell set 31. If the temperature of the battery cell set 31 exceeds the predetermined temperature limit of 55° C., the charging operation is interrupted and will be resumed only when the operating temperature falls once again below the acceptable temperature limit, thereby protecting the battery pack module 3 from damage due to overheating and prolonging the service life of the battery cell set 31.

The 19 VDC voltage input (Va) from the portable computer 1 is also received by the regulator 32, which converts the same into the 5 VDC operating voltage for the charging controller 33. The charging enable/battery-in detect signal from the portable computer 1 informs the charging controller 33 that charging of the battery pack module 3 is conducted internally of the portable computer 1. In addition, the fast/slow charge enable signal from the portable computer 1 informs the charging controller 33 whether or not charging of the battery pack module 3 is conducted simultaneous with the operation of the portable computer 1. When charging of the battery pack module 3 is conducted simultaneous with the operation of the portable computer 1, the charging controller 33 will control the DC-to-DC converter 34 to initiate charging of the battery cell set 31 under the slow charge mode. When charging of the battery pack module 3 is conducted while the portable computer 1 is not in use, the charging controller 33 will control the DC-to-DC converter 34 to initiate charging of the battery cell set 31 under the fast charge mode.

When the cell voltage of any one of the battery cells of the battery cell set 31 exceeds 4.2 VDC, the first charging protection unit 35 will control the charging protection switch 361 to interrupt the charging operation and allow the cell voltages of the battery cells of the battery cell set 31 to drop. When the cell voltages drop below 4.2 VDC, the first charging protection unit 35 will once again control the charging protection switch 361 to resume the charging operation. In the event that the cell voltages continue to rise even after the charging protection switch 361 has been controlled by the first charging protection unit 35 to interrupt the charging operation, the second charging protection unit 37 will compare the cell voltages with an internal reference voltage that serves as the predetermined second upper limit. When the cell voltages exceed the internal reference voltage, the second charging protection unit 37 will control the voltage safety protection switch 365 to disconnect the battery cell set 31 from the charging protection switch 361 and the discharging protection switch 363.

While the battery cell set 31 is being charged, if the charging operation was interrupted by the action of the first charging protection unit 35 on the charging protection switch 361 by a time period that exceeds fifteen seconds, this indicates that the battery cell set 31 is fully charged. The charging controller 33 then controls the indicator 331 to emit green light, and further controls the DC-to-DC converter 34 to supply the charging current of 0.2 A to the battery cell set 31 at this time.

When the user selects to charge the battery pack module 3 using the AC adapter 2, the adapter 2 will convert an AC line voltage and provide the 19 VDC voltage input (Vin) to the DC-to-DC converter 34. At this time, the charging controller 33 controls the DC-to-DC converter 34 to generate the charging current for charging the battery cell set 31. The 19 VDC voltage input (Va) from the adapter 2 is also received by the regulator 32, which converts the same into the 5 VDC operating voltage for the charging controller 33. Due to the absence of the charging enable/battery-in detect signal and the fast/slow charge enable signal from the portable computer 1, the charging controller 33 is able to determine that charging of the battery pack module 3 is being conducted with the use of the AC adapter 2. At this time, the charging controller 33 will control the DC-to-DC converter 34 to initiate charging of the battery cell set 31 under the fast charge mode. As with the previous operation described beforehand, when the cell voltage of any one of the battery cells of the battery cell set 31 exceeds 4.2 VDC, the first charging protection unit 35 will control the charging protection switch 361 to interrupt the charging operation and allow the cell voltages of the battery cells of the battery cell set 31 to drop. When the cell voltages drop below 4.2 VDC, the first charging protection unit 35 will once again control the charging protection switch 361 to resume the charging operation. In the event that the cell voltages continue to rise even after the charging protection switch 361 has been controlled by the first charging protection unit 35 to interrupt the charging operation, the second charging protection unit 37 will control the voltage safety protection switch 365 to disconnect the battery cell set 31 from the charging protection switch 361 and the discharging protection switch 363 when the cell voltages exceed the second upper limit.

Moreover, while the battery cell set 31 is being charged, if the charging operation was interrupted due to the action of the first charging protection unit 35 on the charging protection switch 361 by more than fifteen seconds, the charging controller 33 will control the indicator 331 to emit green light, and further control the DC-to-DC converter 34 to supply the charging current of 0.2 A to the battery cell set 31.

If the battery cells of the battery cell set 31 eventually discharge to the lower limit of 2.4 VDC due to use of the portable computer 1, the first charging protection unit 35 will control the discharging protection switch 363 to prevent further discharging of the battery cell set 31, thereby protecting the latter from damage due to over-discharging and prolonging the service life of the same.

During charging of the battery cell set 31 under the fast charge mode, the charging controller 33 also controls the DC-to-DC converter 34 to interrupt the charging operation when the operating temperature of the battery cell set 31 exceeds 55° C., and to resume the charging operation when the temperature falls once again below the acceptable temperature limit.

As mentioned beforehand, the charging controller 33 further has the ability to control the DC-to-DC converter 34 to initiate the charging operation automatically. Starting from the most recent time the battery cell set 3 was fully charged with the use of the A C adapter 2, a predetermined time period of twenty days elapses before the charging controller 33 continuously detects the residual charged energy of the battery cell set 31. Thereafter, if it is detected that the residual charged energy of the battery cell set 31 has dropped below 75% of full capacity, the charging controller 33 will control the DC-to-DC converter 34 to commence charging of the battery cell set 31 to full capacity automatically.

Figure 3A:
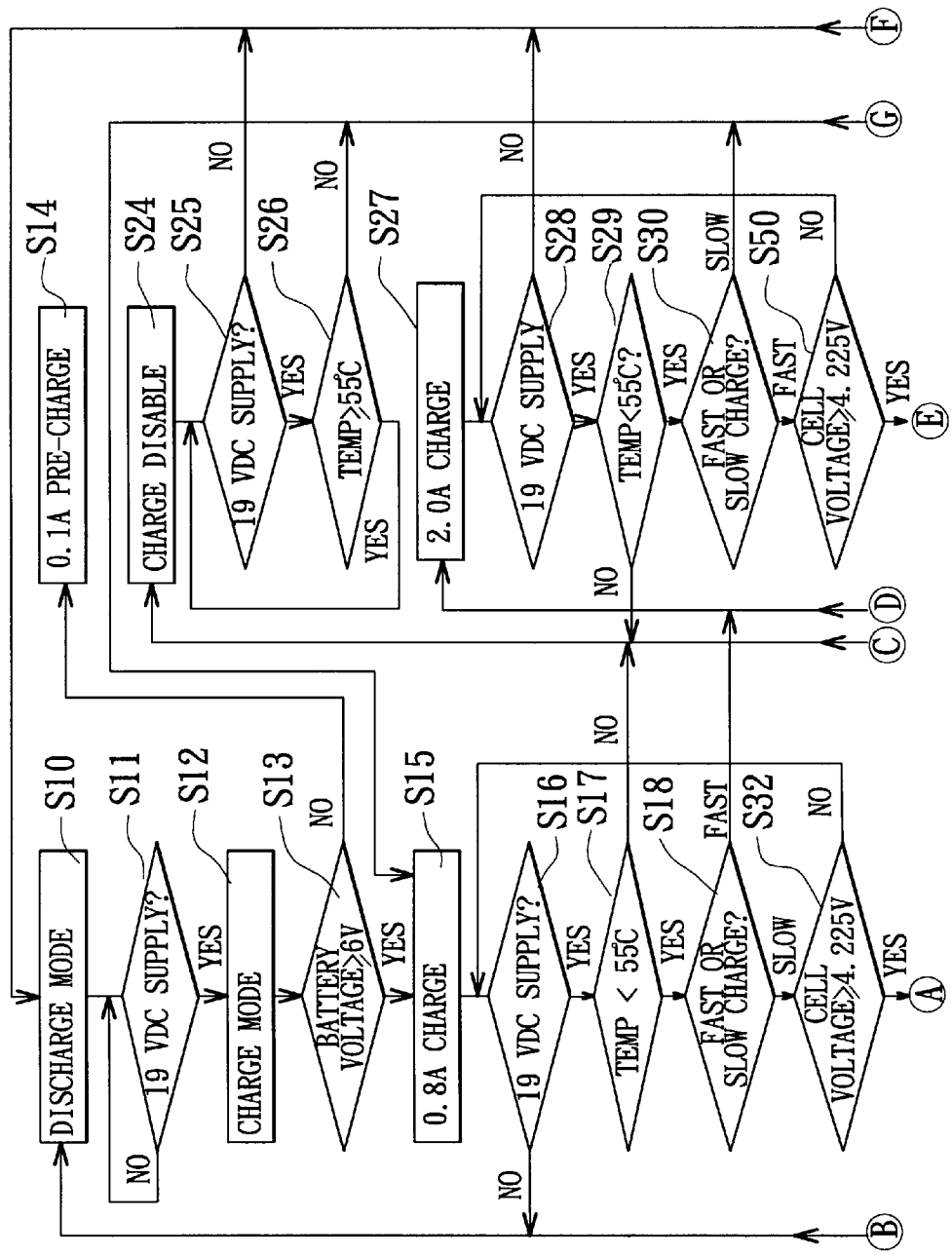
FIGS. 3A and 3B are flowcharts that illustrate the operation of a charging controller of the preferred embodiment.
Figure 3B:
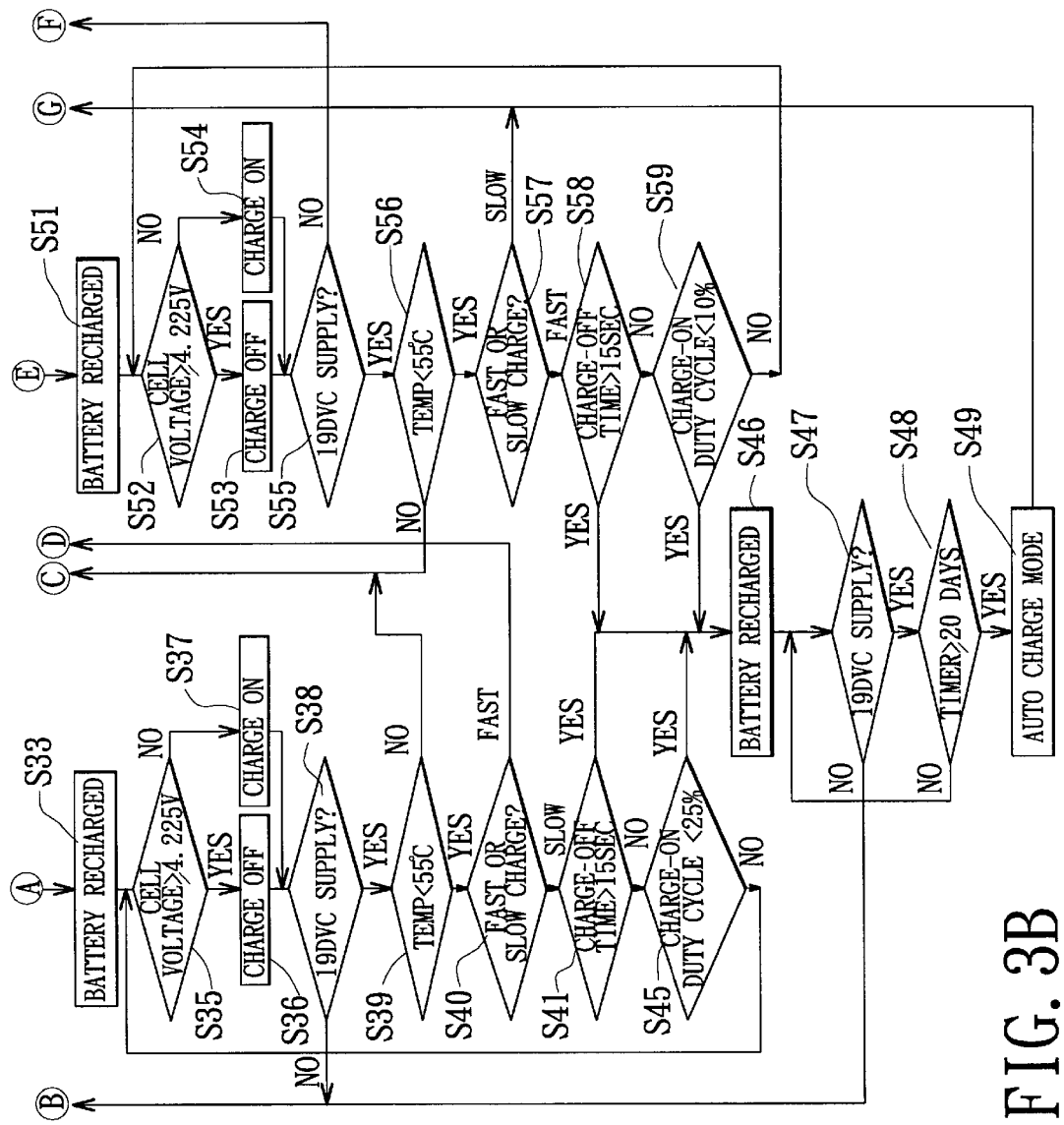

FIGS. 3A and 3B are flowcharts that illustrate the operation of charging controller 33 of the battery pack module 3 of the preferred embodiment. Initially, in step S10, the charging controller 33 operates in a discharge mode. When it is desired to charge the battery cell set 31 using the portable computer 1 or the AC adapter 2, the charging controller 33 waits for the presence of the 19 VDC voltage input (Va or Vin) in step S11. Step S11 is continuously repeated until the 19 VDC voltage input (Va or Vin) is detected. Upon detection of the 19 VDC voltage input (Va or Vin), the charging controller 33 operates in the charge mode in step S12. The indicator 331 emits yellow light at this time. In step S13, the charging controller 33 initially detects if the output voltage of the battery cell set 31 exceeds 6 volts. If the output voltage of the battery cell set 31 is below 6 volts, the flow proceeds to step S14, where the charging controller 33 operates in a pre-charge mode. This will be described in greater detail with reference to FIG. 4. If the output voltage of the battery cell set 31 is greater than or equal to 6 volts, the flow proceeds to step S15, where the charging controller 33 initially operates in a 0.8 A slow charge mode, in which the charging controller 33 controls the DC-to-DC converter 34 to generate a smaller charging current of 0.8 A for charging the battery cell set 31. In step S16, the charging controller 33 once again detects the presence of the 19 VDC voltage input (Va or Vin). If the 19 VDC voltage input (Va or Vin) was not detected, the flow goes back to step S10. If the 19 VDC voltage input (Va or Vin) was detected, the flow proceeds to step S17, where the charging controller 33 monitors the output of the temperature detector 333 to determine if the operating temperature of the battery cell set 31 is below the upper temperature limit of 55° C. If the operating temperature of the battery cell set 31 is above the upper temperature limit, the flow proceeds to step S24, where the charging controller 33 disables the DC-to-DC converter 34 to stop the charging operation. If the operating temperature of the battery cell set 31 is below the upper temperature limit, the flow proceeds to step S18, where the charging controller 33 determines whether a fast charge operation or a slow charge operation is to be performed. At this time, if the user opted to charge the battery pack module 3 internally of the portable computer 1, and charging of the battery pack module 3 is conducted simultaneous with use of the portable computer 1, the slow charge operation is continued under the smaller charging current of 0.8 A. If it was determined in step S18 that charging of the battery pack module 3 is to be performed with the use of the adapter 2 or with the use of the portable computer 1 but with the latter in an idle state, the flow proceeds to step S27, where the charging controller 33 operates in a 2.0 A fast charge mode, in which the charging controller 33 controls the DC-to-DC converter 34 to generate a larger charging current of 2.0 A for charging the battery cell set 31.

If it was decided to continue with the slow charge operation in step S18, the flow proceeds to step S32, where it is determined if the cell voltages of the battery cells of the battery cell set 31 exceed a predetermined upper limit of 4.225 VDC. The flow goes back to step S16 to continue with the slow charge operation if the cell voltages of the battery cells of the battery cell set 31 are lower than 4.225 VDC. Otherwise, the flow proceeds to step S33, where a preliminary determination that the battery cell set 31 has been fully recharged is made. Thereafter, it is detected once again in step S35 if the cell voltages of the battery cells of the battery cell set 31 exceed the predetermined upper limit of 4.225 VDC. The flow goes to step S37, where the charging operation is continued, if the cell voltages of the battery cells of the battery cell set 31 are lower than 4.225 VDC. Otherwise, the flow proceeds to step S36, where the charging operation is interrupted. After step S36 or step S37, the flow proceeds to step S38, where the charging controller 33 once again detects the presence of the 19 VDC voltage input (Va or Vin). If the 19 VDC voltage input (Va or Vin) was not detected, the flow goes back to step S10. If the 19 VDC voltage input (Va or Vin) was detected, the flow proceeds to step S39, where the charging controller 33 determines if the operating temperature of the battery cell set 31 is below the upper temperature limit of 55° C. If the operating temperature of the battery cell set 31 is above the upper temperature limit, the flow proceeds to step S24. Otherwise, the flow proceeds to step S40, where it is determined if charging of the battery cell set 31 is selected under the fast or slow charge operation. This enables the charging controller 33 to adjust to a change in the operating state of the portable computer 1. If the fast charge operation is selected, the flow proceeds to step S27. Otherwise, the flow proceeds to step S41, where the charging controller 33 determines if the slow charge operation was interrupted for a period of more than 15 seconds. If yes, step S46 is performed, where a final determination that the battery cell set 31 has been fully recharged is made. The indicator 331 is controlled to emit green light, and the DC-to-DC converter 34 is controlled so as to generate a charging current of 0.2 A at this time.

If the decision made in step S41 is no, step S45 is performed, where the charging controller 33 determines if the charging duty cycle of the DC-to-DC converter 34 is less than 25%. Step S46 is performed if the charging duty cycle is less than 25%. Step S35 is repeated if the charging duty cycle is greater than 25% to continue with the slow charge operation. After step S24, step S25 is performed, where the charging controller 33 again detects the presence of the 19 VDC voltage input (Va or Vin). If the 19 VDC voltage input (Va or Vin) was not detected, the flow goes back to step S10. If the 19 VDC voltage input (Va or Vin) was detected, the flow proceeds to step S26, where the charging controller 33 determines if the operating temperature of the battery cell set 31 is greater than or equal to the upper temperature limit of 55° C. If yes, the flow goes back to step S25. Otherwise, the flow goes back to step S15.

After step S27, step S28 is performed, where the charging controller 33 again detects the presence of the 19 VDC voltage input (Va or Vin). If the 19 VDC voltage input (Va or Vin) was not detected, the flow goes back to step S10. If the 19 VDC voltage input (Va or Vin) was detected, the flow proceeds to step S29, where the charging controller 33 determines if the operating temperature of the battery cell set 31 is below the upper temperature limit of 55° C. If no, the flow proceeds to step S24. If yes, the flow proceeds to step S30, where the charging controller 33 verifies whether the fast charge operation or the slow charge operation is selected. This allows the charging controller 33 to adapt to changes in the operating state of the portable computer 1. The flow goes back to step S15 if the slow charge operation is selected. Otherwise, the flow proceeds to step S50, where it is determined if the cell voltages of the battery cells of the battery cell set 31 exceed the predetermined upper limit of 4.225 VDC. The flow goes back to step S28 if the cell voltages of the battery cells of the battery cell set 31 are lower than 4.225 VDC to continue with the fast charge operation. Otherwise, the flow proceeds to step S51, where a preliminary determination that the battery cell set 31 has been fully recharged is made. Thereafter, it is detected once again in step S52 if the cell voltages of the battery cells of the battery cell set 31 exceed the predetermined upper limit of 4.225 VDC. The flow goes to step S54, where the charging operation is continued, if the cell voltages of the battery cells of the battery cell set 31 are lower than 4.225 VDC. Otherwise, the flow proceeds to step S53, where the charging operation is interrupted. After step S53 or step S54, the flow proceeds to step S55, where the charging controller 33 once again detects the presence of the 19 VDC voltage input (Va or Vin). If the 19 VDC voltage input (Va or Vin) was not detected, the flow goes back to step S10. If the 19 VDC voltage input (Va or Vin) was detected, the flow proceeds to step S56, where the charging controller 33 determines if the operating temperature of the battery cell set 31 is below the upper temperature limit of 55° C. If no, the flow proceeds to step S24. Otherwise, the flow proceeds to step S57, where it is determined if the fast charge operation of the slow charge operation is selected for charging the battery cell set 31. If the slow charge operation is selected, the flow proceeds to step S15. Otherwise, the flow proceeds to step S58, where the charging controller 33 determines if the fast charge operation was interrupted for a period of more than 15 seconds. If yes, step S46 is performed. Otherwise, step S59 is performed, where the charging controller 33 determines if the charging duty cycle of the DC-to-DC converter 34 is less than 10%. Step S46 is performed if the charging duty cycle is less than 10%. Step S52 is repeated if the charging duty cycle is greater than 10% to continue with the fast charge operation.

Figure 4:
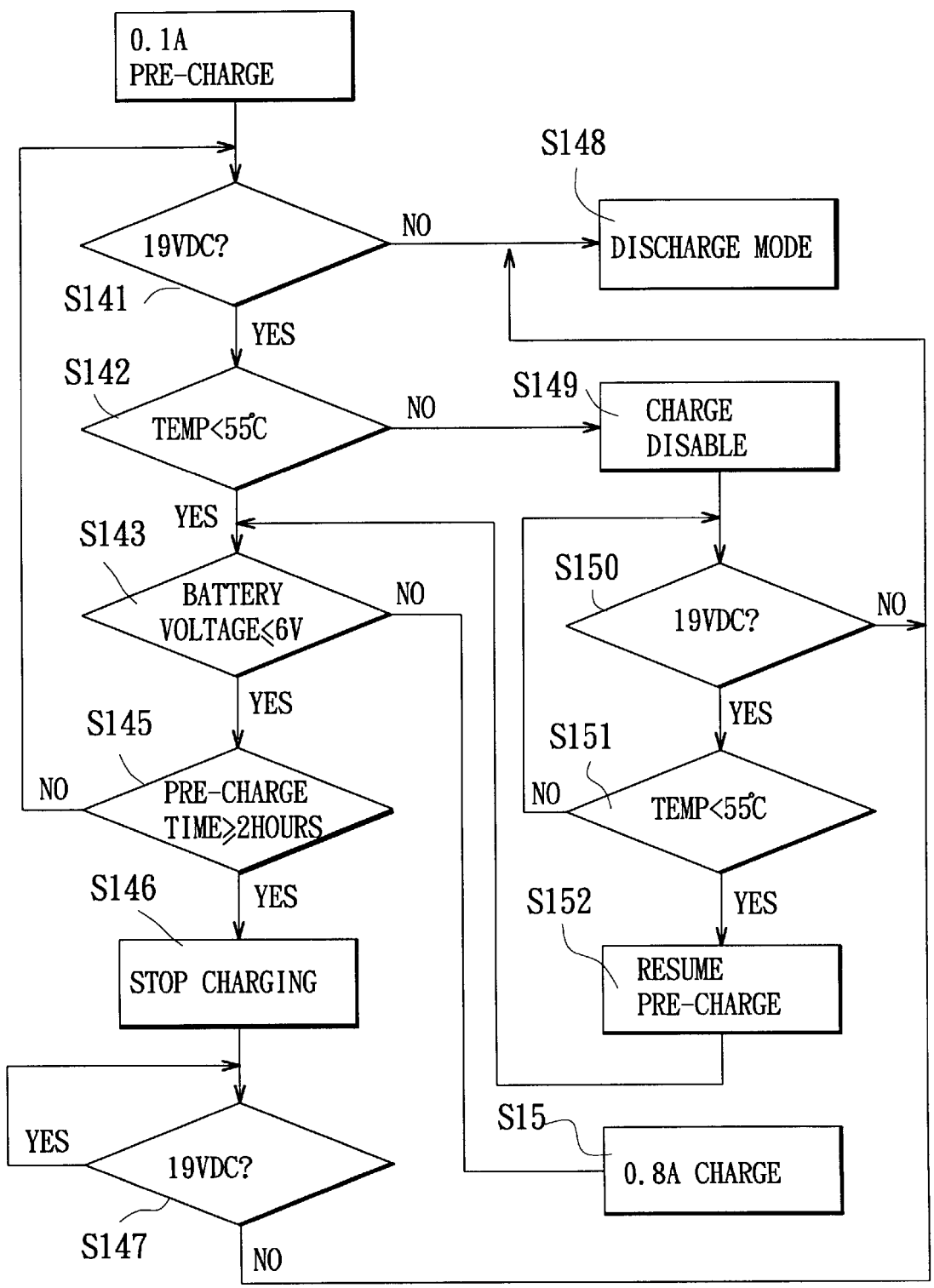
FIG. 4 is a flowchart that illustrates the pre-charge operation of a charging controller of the preferred embodiment.

After step S46, the flow proceeds to step S47, where the charging controller 33 once again detects the presence of the 19 VDC voltage input (Va or Vin). If the 19 VDC voltage input (Va or Vin) was not detected, the flow goes back to step S10. If the 19 VDC voltage input (Va or Vin) was detected, the flow proceeds to step S48, where the charging controller 33 detects if a timer output corresponding to the period of use of the battery cell set 31 and starting from the most recent time of full charging with the use of the adapter 2 has reached the predetermined time period of twenty days. If the timer output has not yet reached the predetermined time period of twenty days, the flow goes back to step S47. If the timer output has reached the predetermined time period of twenty days, and the residual charged energy stored in the battery cell set 31 has dropped below a preset value of 75% of full capacity, the flow proceeds to step S49, where the charging controller 33 automatically initiates the charging operation in which step S15 is performed. FIG. 4 illustrates the pre-charge operation step (S14) in greater detail. In step S141, the charging controller 33 detects the presence of the 19 VDC voltage input (Va or Vin). If the 19 VDC voltage input (Va or Vin) was not detected, the flow goes to step S148, where the charging controller 33 operates in a discharge mode. Charging of the battery cell set 31 is not conducted at this time. If the 19 VDC voltage input (Va or Vin) was detected, the flow proceeds to step S142, where the charging controller 33 determines if the operating temperature of the battery cell set 31 is below the upper temperature limit of 55° C. If yes, the flow proceeds to step S143, where the charging controller 33 detects if the output voltage of the battery cell set 31 is less than or equal to 6 VDC. If yes, step S145 is performed, where the charging controller 33 determines if a pre-charge time of two hours has elapsed. If the pre-charge time has not yet elapsed, the flow goes back to step S141 to continue with the pre-charge operation.

Otherwise, the flow proceeds to step S146, where charging is terminated due to a detected abnormality of the battery cell set 31. The effect of the pre-charge time is to allow the output voltage of the battery cell set 31 to rise to an appropriate level before fast or slow charging is performed.

In step S147, the charging controller 33 continues to detect the presence of the 19 VDC voltage input (Va or Vin) until the latter is no longer detected. The flow then proceeds to step S148, where the charging controller 33 operates in the discharge mode.

If it was determined in step S142 that the operating temperature of the battery cell set 31 is above the upper temperature limit, the flow proceeds to step S149, where the charging controller 33 disables the DC-to-DC converter 34 to stop the charging operation. Subsequently, in step S150, the charging controller 33 again detects the presence of the 19 VDC voltage input (Va or Vin). If the 19 VDC voltage input (Va or Vin) was not detected, the flow goes to step S148. If the 19 VDC voltage input was detected, the flow proceeds to step S151, where the charging controller 33 determines if the operating temperature of the battery cell set 31 is below the upper temperature limit of 55° C. If the operating temperature of the battery cell set 31 is greater than or equal to the upper temperature limit, the flow goes back to step S150. Otherwise, the flow proceeds to step S152, where the charging controller 33 resumes the pre-charge operation. The flow subsequently flows to step S143. If it was determined in step S143 that the output voltage of the battery cell set 31 is greater than 6 VDC, the flow proceeds to step S15, where the charging controller 33 operates in the 0.8 A slow charge mode as described beforehand with reference to FIGS. 3A and 3B.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A rechargeable battery pack module adapted to receive a direct current (DC) voltage input from one of a portable computer and an alternating current (AC) adapter so as to be recharged thereby, comprising:

first and second battery pack terminals;

a battery cell set including a plurality of battery cells connected in series, said battery cell set being connected to said first battery pack terminal, each of said battery cells having a cell voltage;

a DC-to-PC converter having an input side adapted to be connected to said one of the portable computer and the AC adapter, and an output side connected to said second battery pack terminal, said DC-to-DC converter being operable so as to generate charging current from the voltage input;

a safety switch control unit interconnecting said second battery pack terminal and said battery cell set, and operable so as to make electrical connection between said second battery pack terminal and said battery cell set to permit charging of said battery cell set by means of the charging current from said DC-to-DC converter and to permit discharging of said battery cell set via said second battery pack terminal, and so as to break the electrical connection between said second battery back terminal and said battery cell set to stop charging and discharging of said battery cell set;

a first charging protection unit connected to said battery cell set and said safety switch control unit, said first charging protection unit controlling said safety switch control unit to break the electrical connection between said second battery pack terminal and said battery cell set when the cell voltage of any one of said battery cells falls out of a predetermined range; and a battery status indicating unit for storing manufacturer information corresponding to said battery cell set therein, and connected to said battery cell set and capable of obtaining charging status information therefrom, said battery status indicating unit being adapted to be connected to the portable computer and being capable of providing the manufacturer information and the charging status information to the portable computer to permit display of the manufacturer information and the charging status information on a monitor of the portable computer.

2. The rechargeable battery pack module as claimed in claim 1, further comprising means, interconnecting said DC-to-DC converter and said second battery pack terminal, for preventing reverse flow current from flowing into said output side of said DC-to-DC converter.

3. The rechargeable battery pack module as claimed in claim 1, wherein said safety switch control unit includes a charging protection switch and a discharging protection switch connected in series between said battery cell set and said second battery pack terminal, said first charging protection unit controlling said charging protection switch to break the electrical connection between said battery cell set and said second battery pack terminal when the cell voltage of any one of said battery cells exceeds a predetermined first upper limit, said first charging protection unit controlling said discharging protection switch to break the electrical connection between said battery cell set and said second battery pack terminal when the cell voltage of anyone of said battery cells falls below a predetermined lower limit.

4. The rechargeable battery pack module as claimed in claim 3, wherein said safety switch control unit further includes a voltage safety protection switch that connects said charging protection switch and said discharging protection switch to said battery cell set.

5. The rechargeable battery pack module as claimed in claim 4, further comprising a second charging protection unit connected to said battery cell set and said voltage safety protection switch, said second charging protection unit controlling said voltage safety protection switch to disconnect said battery cell set from said charging protection switch and said discharging protection switch when the cell voltage of any one of said battery cells continues to rise and reaches a predetermined second upper limit after said first charging protection unit has controlled said charging protection switch to break the electrical connection between said battery cell set and said second battery pack terminal.

6. The rechargeable battery pack module as claimed in claim 5, wherein said charging protection switch and said discharging protection switch include a field effect transistor, and said voltage safety protection switch includes a resistive device that contains a thermal fuse.

7. The rechargeable battery pack module as claimed in claim 1, wherein the manufacturer information include manufacturing date and expiration date of said battery cell set, and the charging status information include residual charged energy stored in said battery cell set.

8. The rechargeable battery pack module as claimed in claim 1, further comprising a charging controller connected to said DC-to-DC converter and said battery cell set, said charging controller enabling said DC-to-DC converter to generate the charging current in accordance with the cell voltages of said battery cells.

9. The rechargeable battery pack module as claimed in claim 8, wherein said charging controller is connected to said battery cell set via said first charging protection unit.

10. The rechargeable battery pack module as claimed in claim 8, wherein said charging controller is adapted to be connected to said one of the portable computer and the AC adapter, said charging controller controlling said DC-to-DC converter to generate a first charging current when the voltage input is supplied by the AC adapter.

11. The rechargeable battery pack module as claimed in claim 10, wherein said charging controller further controls said DC-to-DC converter to generate the first charging current when the voltage input is provided by the portable computer while the portable computer is not in use, and to generate a second charging current smaller than the first charging current when the voltage input is provided by the portable computer while the portable computer is in use.

12. The rechargeable battery pack module as claimed in claim 8, further comprising a regulator connected to said charging controller and adapted to be connected to said one of the portable computer and the AC adapter, said regulator being adapted to generate an operating voltage for said charging controller from the voltage input.

13. The rechargeable battery pack module as claimed in claim 8, further comprising a temperature detector for detecting temperature of said battery cell set, said temperature detector being connected to said charging controller, said charging controller disabling said DC-to-DC converter from generating the charging current when the temperature of said battery cell set exceeds a predetermined temperature limit.

14. The rechargeable battery pack module as claimed in claim 8, wherein said charging controller further controls said DC-to-DC converter to initiate charging of said battery cell set automatically when residual charged energy stored in said battery cell set drops below a preset value after a predetermined time period starting from the most recent time said battery cell set was fully recharged using the AC adapter has elapsed.

15. The rechargeable battery pack module as claimed in claim 8, further comprising an indicator connected to and controlled by said charging controller to indicate charging status of said battery cell set.

16. The rechargeable battery pack module as claimed in claim 1, wherein said battery cells are lithium-ion battery cells.

* * * * *